United States Patent
Henley et al.

(10) Patent No.: US 7,379,208 B2
(45) Date of Patent: May 27, 2008

(54) HYBRID GAMUT MAPPING

(75) Inventors: Sharon A. Henley, Mountain View, CA (US); Rocklin J. Sloan, San Jose, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 805 days.

(21) Appl. No.: 10/842,029

(22) Filed: May 6, 2004

(65) Prior Publication Data

US 2005/0248785 A1 Nov. 10, 2005

(51) Int. Cl.
  *H04N 1/40* (2006.01)
(52) U.S. Cl. .................................. 358/1.9; 382/162
(58) Field of Classification Search ................ 358/1.9, 358/2.1, 500, 504, 517–518, 527; 382/162, 382/166–167
See application file for complete search history.

(56) References Cited

U.S. PATENT DOCUMENTS

| 6,414,690 | B1 | 7/2002 | Balasubramanian et al. ............. 345/589 |
| 6,611,356 | B1 | 8/2003 | Shimizu et al. .............. 358/1.9 |
| 6,618,499 | B1 | 9/2003 | Kohler et al. ................ 382/162 |
| 6,882,445 | B1 * | 4/2005 | Takahashi et al. ............ 358/1.9 |
| 7,061,503 | B2 * | 6/2006 | Newman ..................... 345/593 |
| 2003/0012427 | A1 | 1/2003 | Martinez-Uriegas et al. ............. 382/162 |
| 2003/0020934 | A1 * | 1/2003 | Nishida ....................... 358/1.9 |
| 2004/0056867 | A1 * | 3/2004 | Cui et al. ..................... 345/590 |
| 2004/0071340 | A1 * | 4/2004 | Kondo et al. ................ 382/162 |
| 2004/0218075 | A1 * | 11/2004 | Tsuruoka ..................... 348/272 |

FOREIGN PATENT DOCUMENTS

WO 02/104002 12/2002

OTHER PUBLICATIONS

R. Balasubramanian, et al., "Gamut Mapping to Preserve Spatial Luminance Variations", Xerox Research & Technology, Webster, NY.
Morovic, J. and Luo, M.R., "The Fundamentals of Gamut Mapping: A Survey", Journal of Imaging Science and Technology, vol. 45, No. 3, pp. 283-290 (2001).

* cited by examiner

*Primary Examiner*—Thomas D. Lee
*Assistant Examiner*—Stephen Brinich
(74) *Attorney, Agent, or Firm*—Fitzpatrick, Cella, Harper & Scinto (57) ABSTRACT

In converting a color in a source gamut to a color in a destination gamut, selection of a conversion technique is determined for the source color based on the hue aspect of the source color, a maximum chroma of the destination gamut associated with the source color's hue aspect, and the lightness value of the source color relative to a lightness value associated with the maximum chroma. In converting a set of colors such as in a digital color image, selection of a conversion technique is performed for each color in the color image, independent of the color aspects of, and/or the conversion technique selected for, neighboring colors.

12 Claims, 9 Drawing Sheets

HYBRID GAMUT MAPPING

BACKGROUND OF THE INVENTION

1. Field of the Invention

The present invention generally relates to computer-implemented color management systems, and processes, and more particularly to selection of a technique for performing gamut mapping from a source gamut to a destination gamut, wherein the selected technique can be a combination, or hybrid, of conversion techniques.

2. Description of the Related Art

In a color management system, gamut mapping is performed to convert, or map, colors between a source gamut and a destination gamut. Each color device has a gamut, which represents the colors that are reproducible by the device. Device gamuts may differ in the sense that not all colors from one device can be reproduced by another device. If a source device's gamut is larger (i.e., contains more reproducible colors) than a destination device's gamut, gamut mapping is performed to convert colors in a source image to colors reproducible by the destination device.

Mapping color data for use with a given device, and its associated gamut, typically entails the use of a gamut mapping algorithm (GMA), which maps colors that fall outside the gamut to an in-gamut color. Gamut mapping is typically performed in a color appearance color space, which is device-independent, and which defines a color with regard to its lightness, chroma and hue aspects. In contrast, a device dependent color space defines a color in terms of its color components. For example, in an RGB device-dependent color space, a color is defined in terms of red, green and blue color components, and in a CMYK color space, a color is defined in terms of cyan, magenta, yellow and black color components.

Ideally, one GMA would be used to map any type of source color data from a source gamut to a destination gamut. However, it has been found that no one GMA works best for all color data. In fact, a number of GMAs have been developed, which have been tested for different types of color images, device gamuts and rendering intents. As a result, knowledge has been gained as to which GMAs are optimal under certain situations. However, colors in a color image can vary widely with respect to their lightness, chroma and hue aspects such that the use of a single GMA to convert all of the colors in the image can result in undesirable results, such as the appearance of artifacts (e.g., uneven transitions in an image and/or a "washing out" of saturated colors) in the output.

Thus, a conventional approach which maps between source and destination gamuts using a single conversion technique for all colors in a source image is not optimal, since it does not take into account specific aspects of each color to be mapped.

SUMMARY OF THE INVENTION

It is an object of the present invention to address the foregoing difficulties and drawbacks, by providing a method and apparatus for selecting between a plurality of techniques for converting a color between source and destination gamuts based on the characteristics of the color and the source and destination gamuts.

According to the present invention, a conversion technique can comprise a single GMA or some combination, or hybrid, of two or more GMAs. A GMA is meant to include any procedure that allows for the colors in a source gamut to be converted to a destination gamut. The present invention performs a selection with respect to each color in a source input based on the hue aspect of the color, a maximum chroma of the destination gamut for the source color's hue aspect, and the lightness value of the source color relative to a lightness value associated with the maximum chroma.

In converting a set of colors such as in a color image, selection of a conversion technique is performed for each color in the color image, independent of the color aspects of, and/or the conversion technique selected for, neighboring colors in the color image.

Advantageously, by virtue of the above, it is possible to map color image data to more appropriately consider the differences between the source and destination gamuts for a given source color in the color image.

According to the present invention, a method is defined, for use with a computing system, for converting a source color having lightness, chroma and hue aspects from a source gamut to a destination gamut. The method comprises identifying a maximum chroma of the destination gamut for the hue of the source color, and selecting one conversion from a plurality of conversions based on a lightness value associated with the maximum chroma of the destination gamut and the lightness value associated with the source color to convert colors from one gamut to another.

This brief summary has been provided so that the nature of the invention may be understood quickly. A more complete understanding of the invention can be obtained by reference to the following detailed description of the preferred embodiment thereof in connection with the attached drawings.

DETAILED DESCRIPTION OF THE PREFERRED EMBODIMENTS

Figure 1:
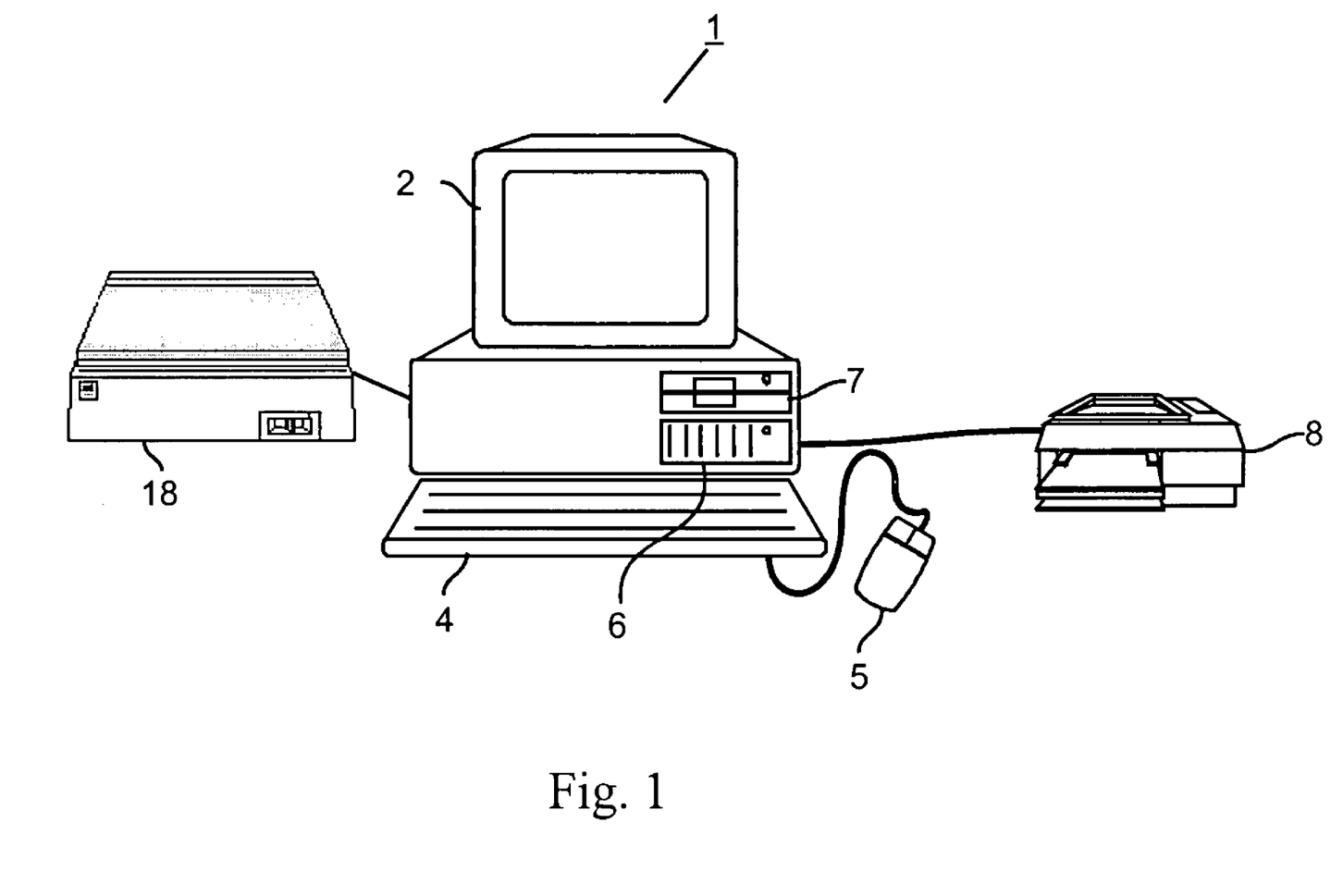
FIG. 1 is an outward view of a hardware environment embodying the present invention.

FIG. 1 is an outward view of representative computing hardware embodying the present invention. Shown in FIG. 1 are computer 1 executing a browser-enabled operating system, such as Microsoft WindowsXP®, display monitor 2 for displaying text and images to a user, keyboard 4 for entering text and commands into computer 1, and mouse 5 for manipulating and for selecting objects displayed on display monitor 2. Also included with computer 1 are fixed disk drive 6, in which are stored application programs, data files, and device drivers for controlling peripheral devices attached to computer 1, floppy disk drive 7 for use in reading data from and writing data to floppy disks inserted therein. Data and/or applications may also be accessed from a CD-ROM via a CD-ROM drive (not shown) or over a network to which computer 1 may be connected (network connection not shown).

Computer 1 may be connected to one or more color devices, such as a scanner 18, printer 8, and display monitor 2. Additional color devices not shown include devices such digital video and still cameras.

Figure 2:
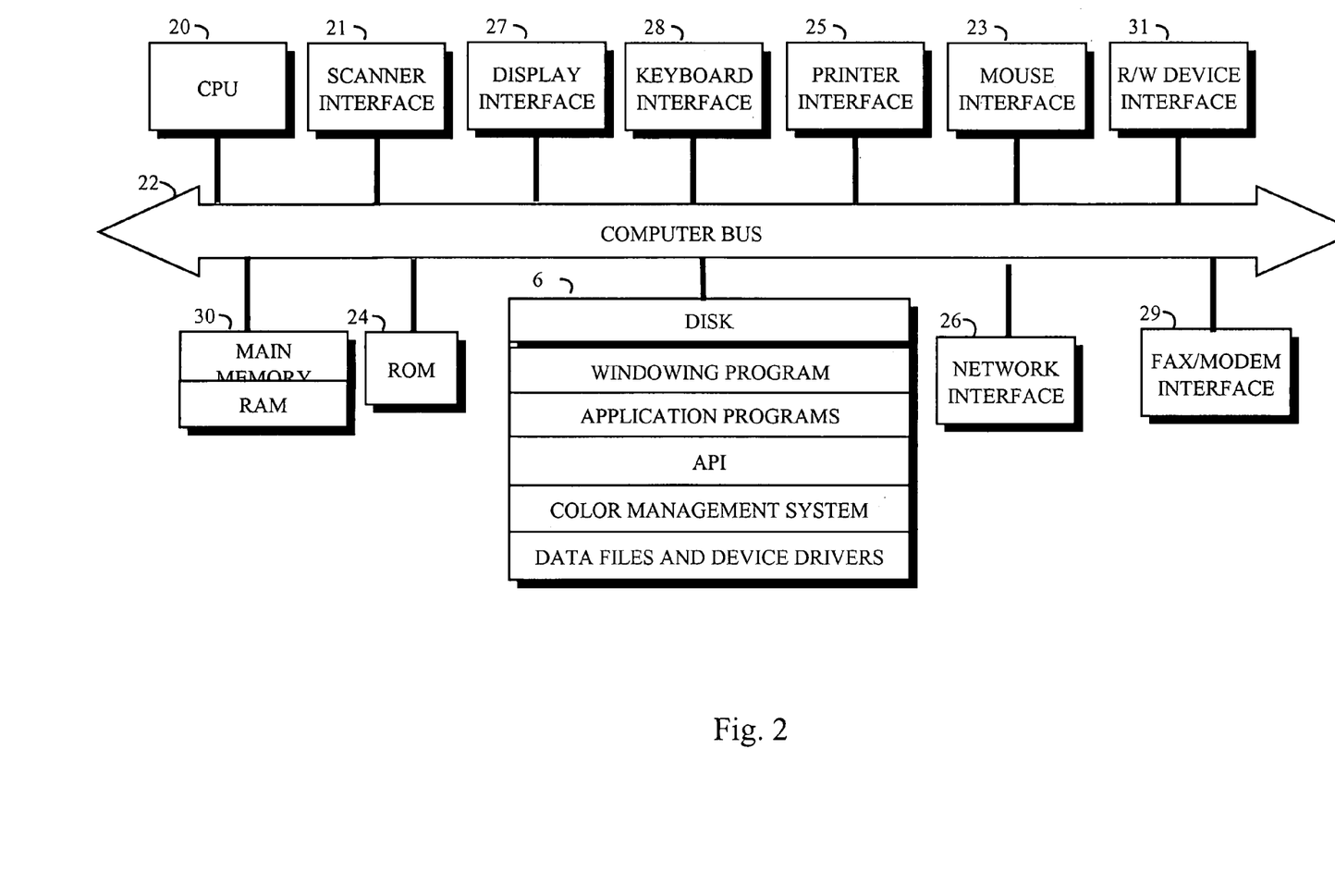
FIG. 2 is a block diagram of the internal architecture of a personal , computer for use in conjunction with the present invention.

FIG. 2 is a block diagram of the internal architecture of computer 1. Shown in FIG. 2 are CPU 20, which is preferably a Pentium-type microprocessor, interfaced to computer bus 22. Also interfaced to computer bus 22 are printer interface 25, to allow computer 1 to communicate with printer 8, modem interface 29 to enable communications between computer 1 and its internal modem, display interface 27 for interfacing with display monitor 2, keyboard interface 28 for interfacing with keyboard 4, and mouse interface 23 for interfacing with mouse 5.

Read only memory (ROM) 24 stores invariant computer-executable process steps for basic system functions such as basic I/O, start up, or reception of keystrokes from keyboard 4.

Main random access memory (RAM) 30 provides CPU 20 with memory storage which can be accessed quickly. In this regard, computer-executable process steps, such as those implementing features of the present invention, are transferred from disk 6, or other storage, over computer bus 22 to RAM 32 and executed therefrom by CPU 20.

Also shown in FIG. 2 is disk 6 which, as described above, includes a windowing operating system, a color management system, and processes, implementing features of the present invention, which are executable on the particular windowing operating system, other applications which may include word processing, spreadsheet, graphics and gaming applications, for example. Disk 6 further includes data files and device drivers as shown.

Figure 3:
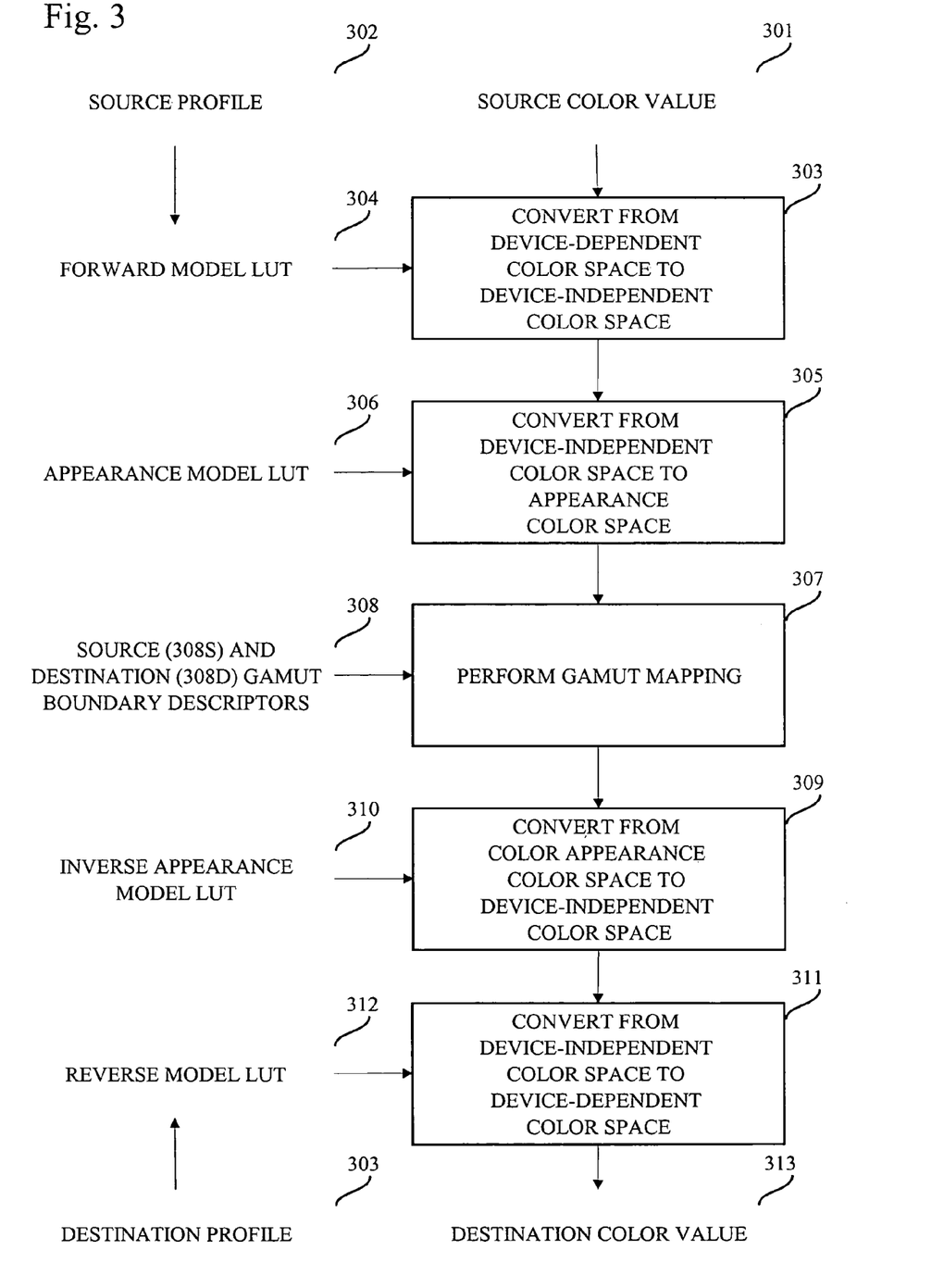
FIG. 3 provides an overview of color processing performed by a color management system according to the present invention.

FIG. 3 provides an overview of color processing performed by a CMS according to the present invention. As input, the CMS receives device profiles (such as source profile 302 and destination profile 303) for each color device, for which it processes color data.

A device profile includes information used to transform color data from the device's color space to a device-independent color space, and to determine the device's color gamut boundary. In one form of the device profile, transformation information is supplied in the device profile in the form of look-up tables (LUTs) and/or mathematical conversions. In addition, a gamut boundary description is provided. Alternatively, a measurement-only profile supplies measurement data which can be used to generate the look-up tables and/or mathematical conversions, as well as the gamut boundary description. In the description provided below, LUTs are used, by way of example, to perform the transformation.

Thus, source profile 302 is used as a source for forward model LUT 304, appearance model 306 and gamut description 308s, and destination profile 303 is used as a source for gamut description 308d, inverse appearance model LUT 310 and reverse model LUT 312, all of which will be discussed in more detail below.

Forward model LUT 304 is used to map a color expressed in a device-dependent color space (e.g., RGB or CMYK) to a color in device-independent color space (e.g., CIEXYZ). Using forward model LUT 304, source color 301, which is expressed in color components of a device-dependent color space is converted to tristimulus values (e.g., XYZ) of a device-independent color space in module 303, for example. Appearance model LUT 306 is used to convert the XYZ color to color appearance space (e.g., CIECAM and CIELab) in module 305. The resulting color is expressed in terms of its lightness, chroma and hue aspects.

Gamut mapping according to the present invention is performed in module 307 using gamut descriptions 308s and 308d, which is described in more detail below.

A gamut-mapped value in color appearance space becomes input to module 309, in which an inverse appearance model LUT 310 is used to convert the appearance space color to device-independent color space. In module 311, a reverse model LUT 312, which maps device-independent colors to device-dependent colors, is used to convert the device-independent color to a destination color value.

It should be apparent that while some of the modules are shown separately, they may be combined, and the corresponding LUTs can also be combined.

Figure 4A:
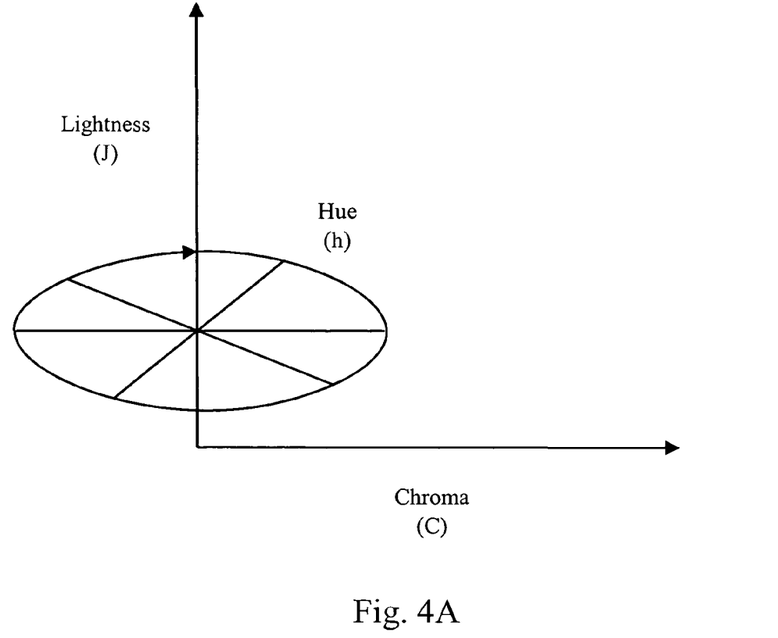
FIGS. 4A and 4B illustrate a color appearance space used in gamut conversion using a hybrid selection according to the present invention.

In the preferred embodiment of the invention, the color appearance data used in module 307 is defined in terms of its lightness, chroma and hue aspects, which are graphically shown in FIG. 4A. Lightness is defined along the y axis, and chroma is defined along the x axis. Given a hue value, which is expressed as an angle, values of lightness and chroma define an approximately triangular area, sometimes referred to as a hue leaf.

Figure 4B:
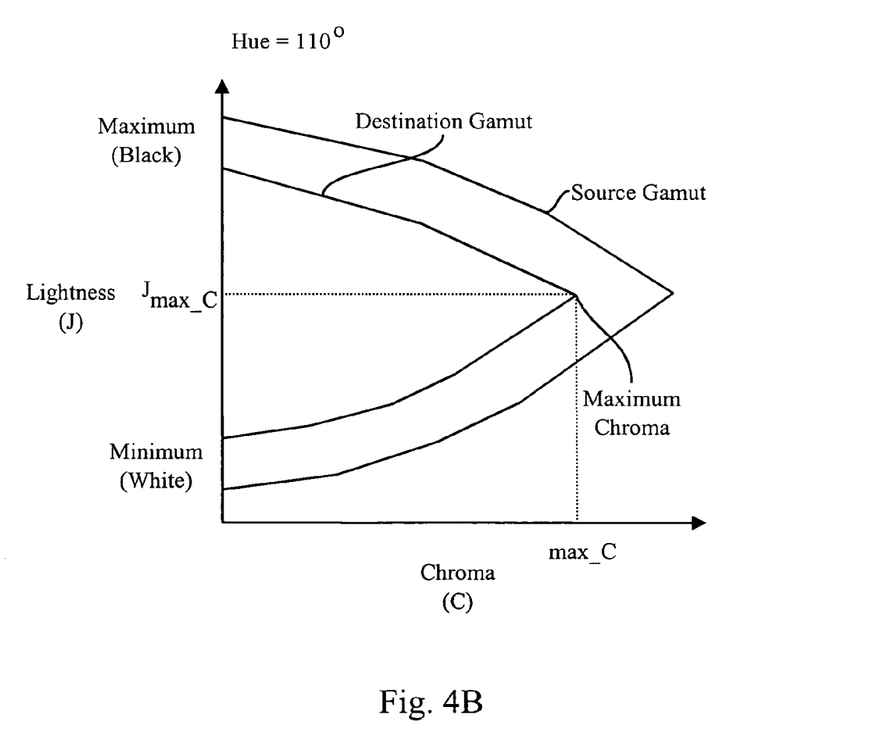

FIG. 4B illustrates a hue leaf, corresponding to a hue angle of 110°, for source and destination gamuts. In the example shown, the destination gamut hue leaf is smaller than the source gamut's hue leaf. A maximum chroma for the destination gamut is shown, which represents the maximum chroma value for the hue leaf. The point, which is defined by a chroma value, max_C, and a lightness value, $J_{max\_C}$, is also referred to as a cusp point.

According to the preferred embodiment of the invention, a hybrid approach is taken in mapping a source color to a destination gamut. More particularly, the hybrid approach selects from a plurality of GMAs to identify one or a combination of two or more GMAs to map an out-of-gamut source color to a color within a destination gamut.

According to the preferred embodiment of the invention, one of the conversions selected uses a GMA to convert the source color by clipping only the chroma of the source color. An example of such a GMA is the LCLIP GMA. A second conversion selection, which is used in a preferred embodiment of the invention, converts the source color to a destination color of the destination gamut using a combination of the LCLIP GMA and a second conversion, which preserves the same hue as the source color and results in a minimum color difference between the source and destination colors. An example of the second conversion uses the HPMINDE GMA.

The present inventors have determined that the HPMINDE and LCLIP GMAs compliment each other in that they offset weaknesses of the other. It should be understood that the hybrid approach used herein can use more than two GMAs, and may use any number of complimentary GMAs.

The HPMINDE gamut mapping technique clips colors that fall outside the source gamut to a color of the same hue angle within the destination gamut and results in a minimum color difference between the source and destination colors. The HPMINDE technique attempts to preserve chroma, and selects a point on the destination gamut "closest to" the source point.

The present inventors have further determined that HPMINDE works well for saturated colors, i.e., those colors that fall below the maximum chroma, or cusp point, of the destination gamut. However, since too much lightness is lost, the HPMINDE does not produce optimum results for light colors. In addition, the inventors have determined that use of HPMINDE can result in clustering around the cusp point, which can result in unsmooth transitions, or edges, in the resulting color image.

Figure 5A:
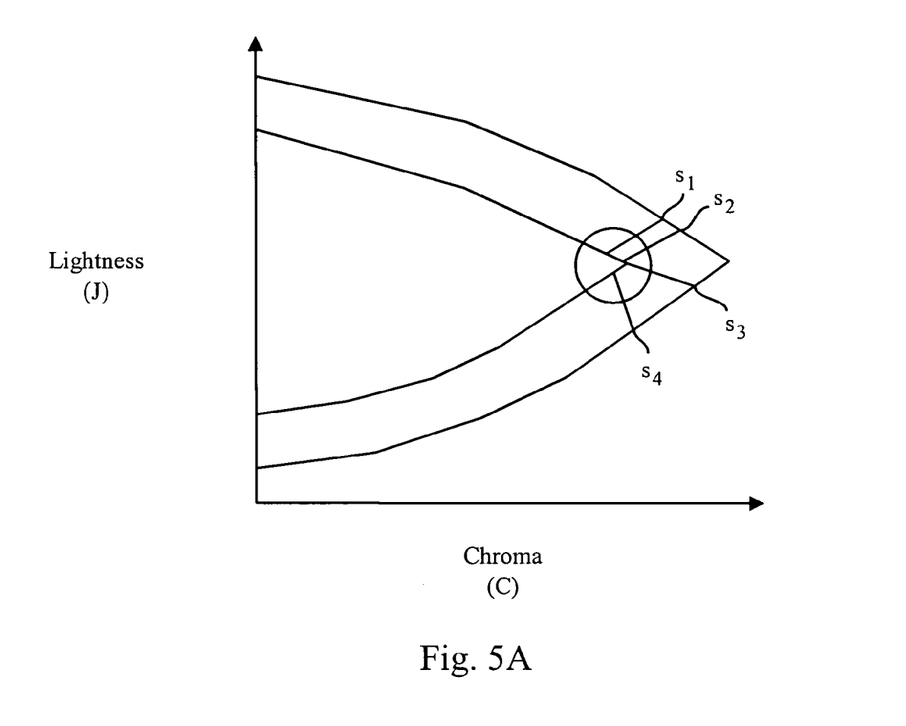
FIGS. 5A and 5B show mappings generated by HPMINDE and LCLIP, which illustrates optimizations of their usage according to the present invention.

FIG. 5A illustrates four source colors, $s_1$, $s_2$, $s_3$ and $s_4$, mapped to the destination gamut using HPMINDE. As can be seen the resulting mappings fall within a small area around the cusp point of the destination gamut, which results in source colors $s_1$, $s_2$, $s_3$ and $s_4$ being mapped to similar colors in the destination gamut. As discussed above, this can result is less than smooth transitions in the resulting image data. In addition, as can be seen with respect to source color $s_4$, the original lightness aspect is not preserved by HPMINDE.

Figure 5B:
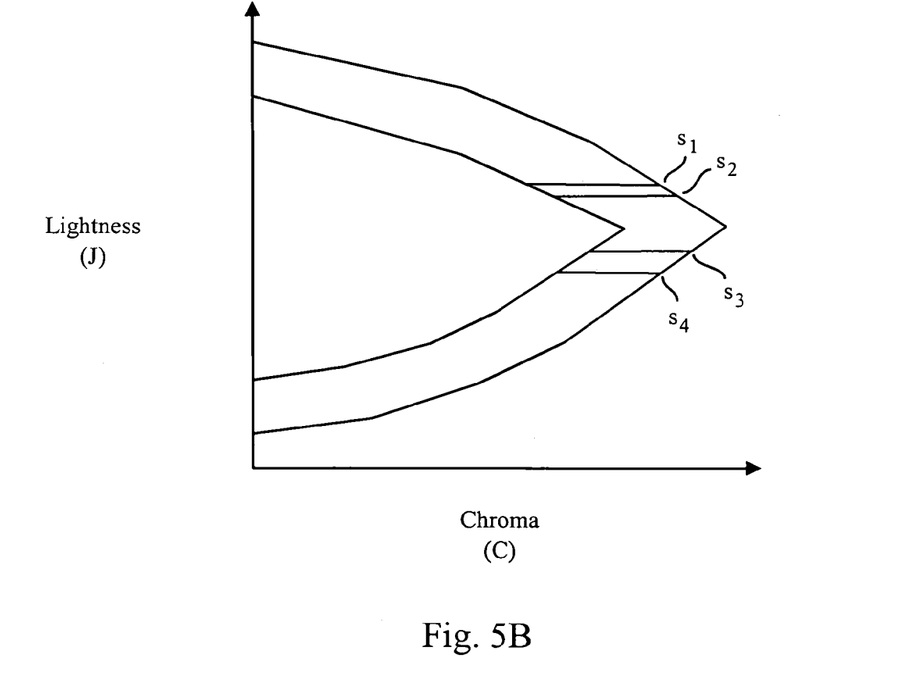

The LCLIP technique clips a source color that falls outside the destination gamut to within the destination gamut. FIG. 5B illustrates mapping of the four source colors, $s_1$, $s_2$, $s_3$ and $s_4$, using LCLIP. The inventors have determined that since LCLIP does not preserve chroma, saturated colors appear "washed out".

Accordingly, in order to minimize the weaknesses identified with respect to these GMAs, the present invention uses a hybrid approach, which selects a gamut mapping conversion from a plurality of conversions based on a lightness value associated with the maximum chroma of the destination gamut and the lightness value associated with the source color.

Figure 6A:
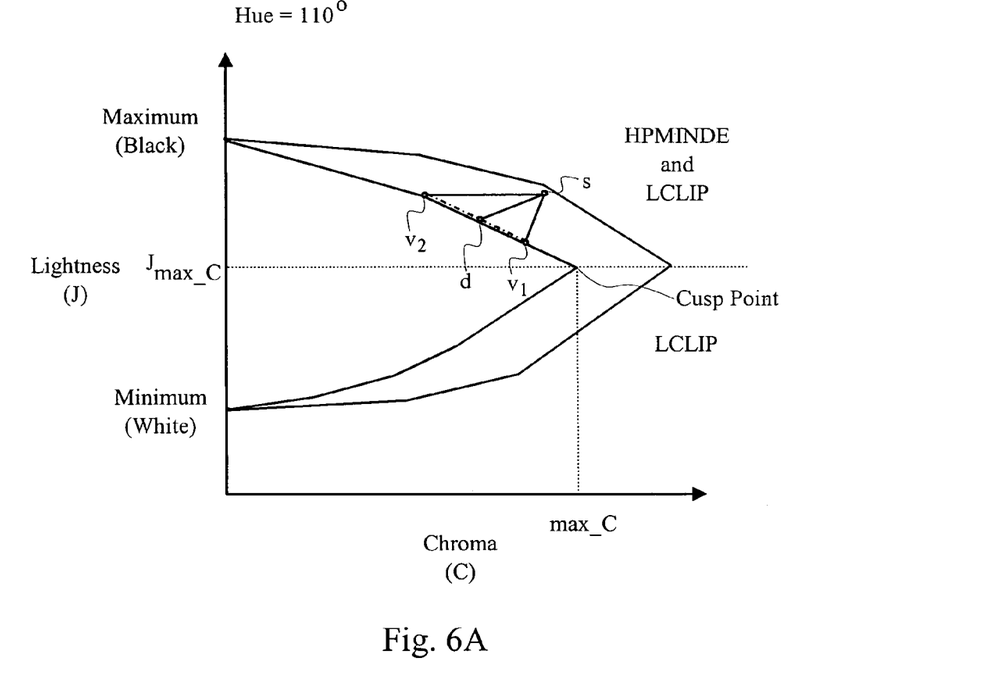
FIGS. 6A and 6B illustrate examples of hybrid conversion selections according to a preferred embodiment of the present invention.
Figure 6B:
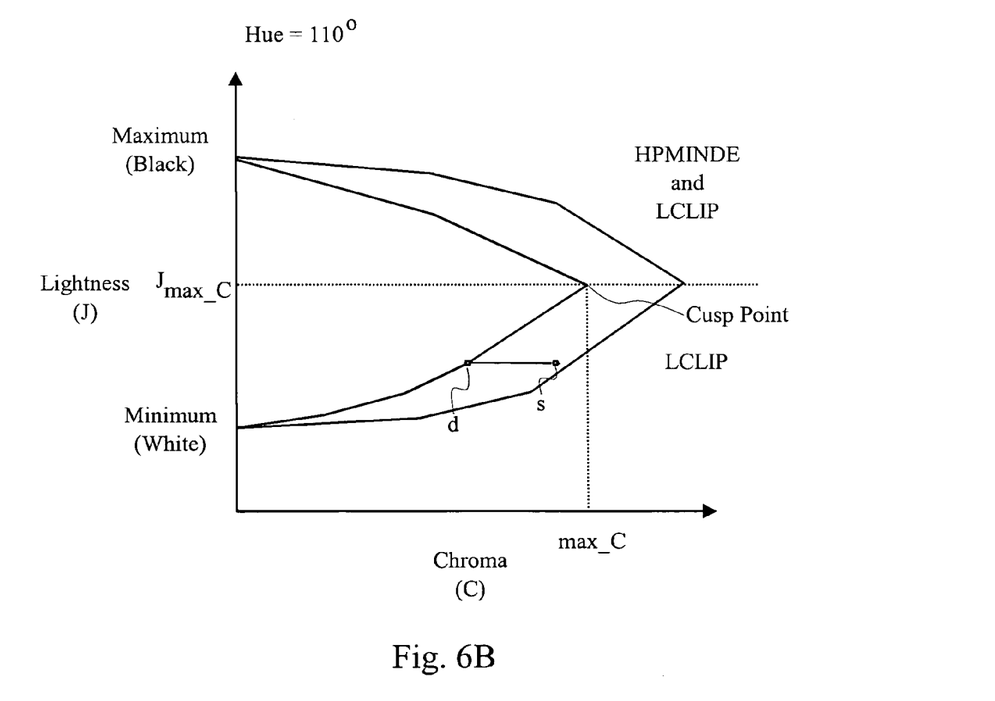

Before a source input is gamut-mapped, the minima and maxima lightness values of the source and destination gamuts are linearly transformed onto each other. In the example shown in FIG. 4B, the source and destination hue leaves have different minimum (white) and maximum (black) lightness values. According to the preferred embodiment of the invention, a linear scaling is used to scale the source minimum lightness value to the destination's minimum lightness value. Similarly, the source's maximum lightness value is scaled to the destination's maximum lightness value. FIG. 6 illustrates an example of the source and destination gamut hue leaves after the linear transformation of the minima and maxima points according to the present invention.

Generally, the transformation which is performed on the lightness values of the source hue leaf involves potentially three adjustments. First, the source lightness values are adjusted to position the source minimum at zero. If the source minimum is originally zero, there is no need to perform this adjustment. The adjusted source lightness values are scaled based on the source and destination maximum lightness values. If the source and destination maxima are the same, this adjustment is not needed. Finally, the adjusted and scaled source lightness values are adjusted so that the source minimum lightness is coincident with the destination's minimum lightness. If these minima are already coincident, the final adjustment need not be performed.

Figure 8:
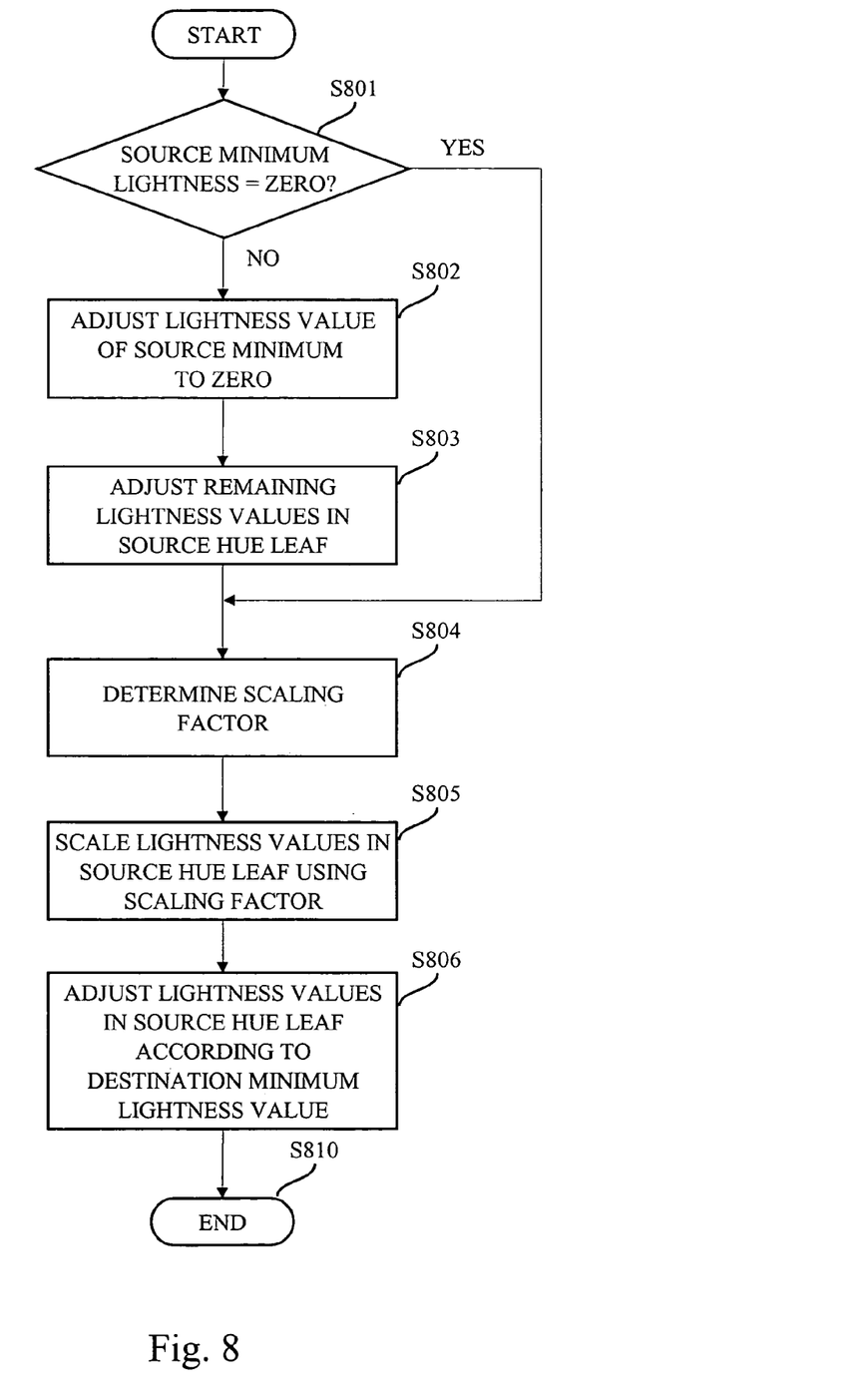
FIG. 8 provides a flow diagram of process steps to scale the minima and maximum lightness of the source and destination gamuts according to the present invention.

FIG. 8 provides a flow diagram of process steps to scale the minima and maximum lightness of the source and destination gamuts according to the present invention.

At step S801, a determination is made whether the source minimum lightness value is equal to zero. If the source minimum lightness value is equal to zero, processing continues at step S804. If not, processing continues at steps S802 and S803 to adjust the lightness values of the source hue leaf to account for the nonzero minimum lightness value. More particularly, the minimum lightness value of the source hue leaf is adjusted to zero. For example, if the minimum lightness value of the source hue leaf has a value of 2, the source minimum lightness value is decreased by 2. At step S803, the remaining lightness values in the source hue leaf are adjusted by the same value used in step S802, and processing continues at step S804.

At step S804, a scaling factor is determined based on the maximum lightness values of the source and destination hue leaves. Preferably, the factor is a ratio of the maximum lightness value of the destination hue leaf to the maximum lightness value of the source hue leaf. For example, a factor of 90 over 98 is used where the maxima destination and source lightness values are 90 and 98, respectively.

At step S805, the scaling factor is applied to each of the lightness values of the source hue leaf. At step S806, each lightness value in the source leaf is adjusted based on the minimum lightness value of the destination hue leaf. More particularly, if the minimum lightness value of the destination hue leaf is equal to 8, each lightness value in the source hue leaf is adjusted by 8.

Figure 7A:
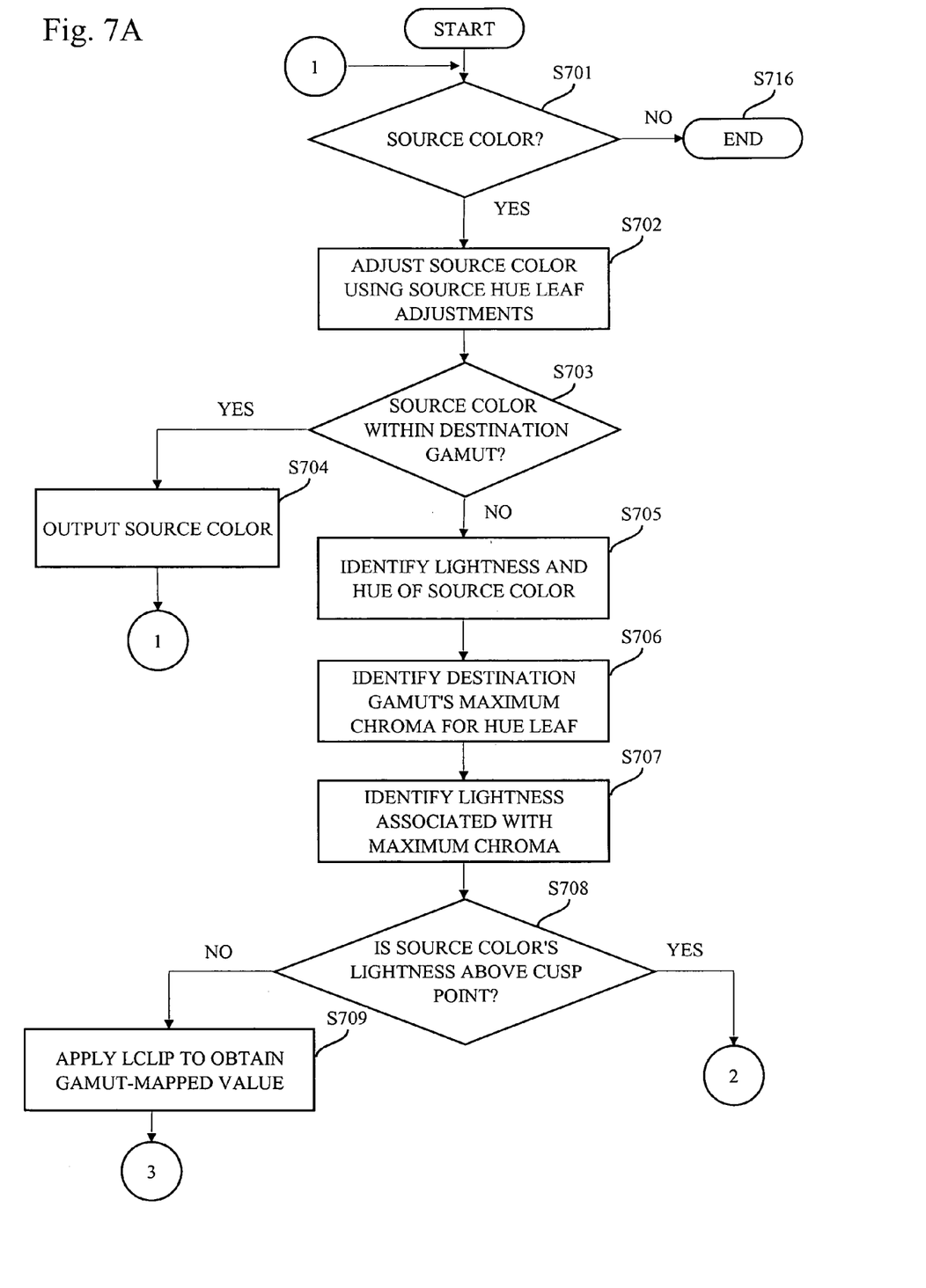
FIGS. 7A and 7B provide a flow diagram of process steps to select a gamut mapping conversion using the hybrid approach, which is applied to a source color, according to the present invention.
Figure 7B:
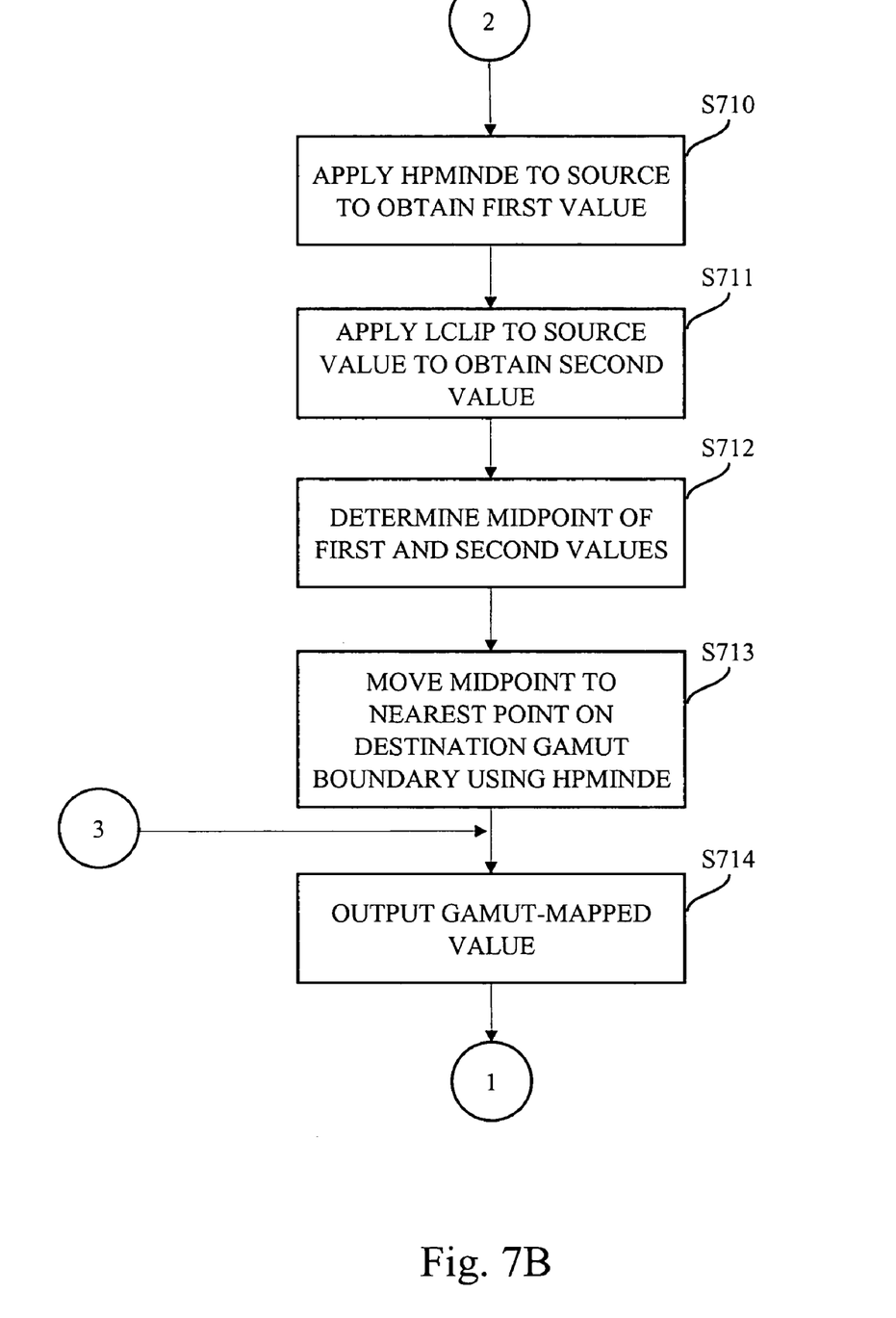

Once the source hue leaf has been adjusted as described above, each source color is processed as described with reference to FIGS. 7A and 7B, which provide a flow of process steps to select a gamut mapping conversion using the hybrid approach, which is then applied to a source color, according the present invention.

At step S701, a determination is made whether or not any source colors remain to be processed. If not processing ends at step S716. If there are remaining source colors to be processed, processing continues at step S702 to adjust the next source color using the same adjustments applied to the source hue leaf discussed above.

That is, with reference to FIG. 8, the source color's lightness value is adjusted by the same amount used to adjust the source minimum's lightness value in step S802. The scaling factor determined in step S804 is then applied to the adjusted source color. Finally, the adjusted and scaled lightness value of the source color is adjusted by the same value used in step S806. Thus, as a result of step S702 of FIG. 7A, the adjusted source color is used as the source color in the remainder of the process steps.

At step S703, the source color is examined to determine whether it falls within the destination gamut. Such a determination can be made using destination gamut boundary description 308d, for example. If so, processing continues at step S704 to output the source color, and processing continues at step S701 to process any remaining source colors.

If it is determined, at step S703, that the source color is outside the destination gamut, the lightness and hue aspects of the source color are identified. A maximum chroma of the hue leaf corresponding to the source color's hue is identified at step S706. At step S707, the lightness aspect corresponding to the maximum chroma value determined in step S706 is identified. Referring to FIG. 4B, the maximum chroma, max_C, of a hue leaf corresponding to a hue angle of 110° is illustrated, with the corresponding lightness aspect designated as $J_{max\_C}$.

Referring again to FIGS. 7A and 7B, a determination is made at step S708 whether the source color falls above the cusp point for the hue leaf designated by the source color's hue angle. This determination is made by comparing the source color's lightness value with $J_{max\_C}$ to determine whether the source color's lightness value is greater than the lightness value, $J_{max\_C}$, corresponding to the maximum chroma.

If the source color is below the cusp point, LCLIP is selected as the gamut conversion to map the source color to the destination gamut. At step S709, LCLIP is applied to the source color to obtain a gamut-mapped value. As described above, the LCLIP preserves the lightness aspect of the source color to obtain the gamut-mapped value, d, which is within the destination gamut.

The gamut-mapped value, d, determined in step S709 is output at step S714, and processing continues at step S701 to process any remaining source colors.

If it is determined, at step S708, that the source color falls above the cusp point, processing continues to select a combination of HPMINDE and LCLIP to convert the source color to a gamut-mapped color. At step S710, a first value is determined from the source color using the HPMINDE GMA. At step S711, a second value is determined using the source color and LCLIP, which involves mapping chroma while preserving lightness. An average of the first and second values, as determined in steps S710 and S711, is determined at step S712.

According to a preferred embodiment of the invention, the average of the first and second values is determined to be a midpoint between the HPMINDE-mapped value and the LCLIP-mapped value. Referring to FIG. 6, since source color, s, falls above the cusp point, HPMINDE is applied to the source color to obtain a first value, $v_1$. A second value, $v_2$, is obtained by applying LCLIP to the source value. Then, a midpoint, d, between $v_1$ and $v_2$ is calculated.

Referring again to FIGS. 7A and 7B, the midpoint may be located above or below the surface of the destination gamut's boundary. Accordingly, at step S713, the HPMINDE GMA is applied to the midpoint value to adjust the midpoint to the surface of the destination gamut. If the midpoint was originally on the destination gamut boundary, the midpoint will remain on the surface of the destination gamut after application of HPMINDE. Processing continues at step S714 to output the value obtained in step S713. Thereafter, processing continues at step S701 to process any remaining source colors.

The invention has been described above with respect to particular illustrative embodiments. It is understood that the invention is not limited to the above-described embodiments and that various changes and modifications may be made by those skilled in the relevant art without departing from the spirit and scope of the invention.

What is claimed is:

1. For use with a computing system, a method of converting a source color having lightness, chroma and hue aspects from a source gamut to a destination gamut comprising:

identifying a maximum chroma of the destination gamut for the hue of the source color; and selecting one conversion from a plurality of conversions based on a lightness value associated with the maximum chroma of the destination gamut and the lightness value associated with the source color.

2. A method according to claim 1, wherein the selected conversion comprises a single gamut mapping algorithm (GMA).

3. A method according to claim 2, wherein the GMA converts the source color by clipping only the chroma of the source color.

4. A method according to claim 1, wherein the selected conversion comprises a combination of two or more GMAs.

5. A method according to claim 4, wherein the combination comprises an average of the results obtained by the two or more GMAs.

6. A method according to claim 5, wherein the two or more GMAs comprise a first GMA which converts the source color by clipping only the chroma of the source color and a second GMA which converts the source color to a destination color of the destination gamut which shares the same hue and results in a minimum color difference between the source and destination colors.

7. A method according to claim 5, further comprising:

determining whether the average represents a color which is outside the destination gamut; and performing another conversion if it is determined that the colorfalls outside the destination gamut.

8. A method according to claim 7, wherein the other conversion comprises one or more of the GMAs in the combination.

9. A method according to claim 8, wherein the other conversion converts the source color to a destination color of the destination gamut which shares the same hue and results in a minimum color difference between the source and destination colors.

10. A method according to claim 1, further comprising:

scaling lightness values of the source and destination gamuts such that a minimum lightness value of the source gamut is coincident with a minimum lightness value of the destination gamut and a maximum lightness value of the source gamut is coincident with a maximum lightness value of the destination.

11. A method according to claim 10, wherein the scaling is a linear scaling.

12. A computer-readable memory medium in which computer-executable process steps are stored, the process steps for use with a computing system to convert a source color having lightness, chroma and hue aspects from a source gamut to a destination gamut, wherein the process steps implement a method according any of claims 1 to 11.

* * * * *

UNITED STATES PATENT AND TRADEMARK OFFICE
CERTIFICATE OF CORRECTION

PATENT NO. : 7,379,208 B2 Page 1 of 1
APPLICATION NO. : 10/842029
DATED : May 27, 2008
INVENTOR(S) : Sharon A. Henley et al.

It is certified that error appears in the above-identified patent and that said Letters Patent is hereby corrected as shown below:

COLUMN 2:
Line 39, "personal, computer" should read -- personal computer --.

COLUMN 3:
Line 15, "such" should read -- such as --.

COLUMN 6:
Line 36, "according" should read -- according to --.

COLUMN 7:
Line 21, "HPM IN DE" should read -- HPMINDE --.

COLUMN 8:
Line 30, "colorfalls" should read -- color falls --; and
Line 54, "according" should read -- according to --.

Signed and Sealed this

Twenty-first Day of October, 2008

JON W. DUDAS
*Director of the United States Patent and Trademark Office*